United States Patent [19]

Rath

[11] Patent Number: 5,910,550
[45] Date of Patent: Jun. 8, 1999

[54] PREPARATION OF MEDIUM MOLECULAR WEIGHT, HIGHLY REACTIVE POLYISOBUTENE

[75] Inventor: Hans Peter Rath, Grünstadt, Germany

[73] Assignee: BASF Aktiengesellschaft, Ludwigshafen, Germany

[21] Appl. No.: 08/851,351

[22] Filed: May 6, 1997

[30] Foreign Application Priority Data

May 13, 1996 [DE] Germany .................. 196 19 267

[51] Int. Cl.⁶ .................. C08F 4/14; C08F 110/10
[52] U.S. Cl. .................. 526/237; 526/64; 526/209; 526/210; 526/212; 526/216; 526/348.7; 585/510; 585/525
[58] Field of Search .................. 526/237, 64, 648.7, 526/209, 210, 212, 216; 585/510, 525; 524/579

[56] References Cited

U.S. PATENT DOCUMENTS

| | | | |
|---|---|---|---|
| 2,727,022 | 12/1955 | Linsk | 526/348.7 X |
| 4,914,166 | 4/1990 | Kennedy et al. | 526/348.7 X |
| 4,943,616 | 7/1990 | Mishra et al. | 526/237 X |
| 5,254,649 | 10/1993 | Miln et al. | 526/237 X |
| 5,408,018 | 4/1995 | Rath | 526/237 |
| 5,448,001 | 9/1995 | Baird | 526/134 |
| 5,563,313 | 10/1996 | Chung et al. | 585/525 |

FOREIGN PATENT DOCUMENTS

| | | |
|---|---|---|
| 279 456 | 8/1988 | European Pat. Off. . |
| 355 997 | 2/1990 | European Pat. Off. . |
| 481 297 | 4/1992 | European Pat. Off. . |
| 671 419 | 9/1995 | European Pat. Off. . |

*Primary Examiner*—Fred Teskin
*Attorney, Agent, or Firm*—Keil & Weinkauf

[57] ABSTRACT

Polyisobutene having an average molecular weight $M_n$ of from above 5000 to 80,000 dalton and containing more than 50 mol % of terminal double bonds is prepared by a novel process, by cationic polymerization of an isobutene-containing hydrocarbon mixture in the liquid phase in the presence of a boron trifluoride complex catalyst, and has a dispersity of $M_w/M_n$ of from 2 to 4 and is contained in lubricants.

6 Claims, No Drawings

PREPARATION OF MEDIUM MOLECULAR WEIGHT, HIGHLY REACTIVE POLYISOBUTENE

The present invention relates to a process for the preparation of medium molecular weight, highly reactive polyisobutene having an average molecular weight $M_n$ of from 5000 to 80,000 dalton and containing at least 50 mol % of terminal double bonds (vinylidene groups), and the polyisobutenes obtainable thereby.

Low molecular weight and high molecular weight polyisobutenes having molecular weights up to several 100,000 dalton have long been known. Their preparation is described, for example, in H. Güterbock: Polyisobutylen und Mischpolymerisate, pages 77 to 104, Springer, Berlin 1959. The currently available polyisobutenes of this molecular weight range are prepared with the aid of Lewis acid catalysts, such as aluminum chloride, alkylaluminum chlorides or boron trifluoride, and generally have less than 10 mol % of terminal double bonds (vinylidene groups) and molecular weight distributions (dispersity $M_w/M_n$) of from 3 to 7 for molecular weights $M_n$ above 5000.

The highly reactive polyisobutenes which generally have average molecular weights from 500 to 5000 dalton and frequently contain more than 60 mol % of vinylidene groups must be distinguished from these conventional polyisobutenes. Such highly reactive polyisobutenes are used as intermediates for the preparation of additives for lubricants and fuels, as described, for example, in DE-A 27 02 604. For the preparation of these additives, polyisobutene/maleic anhydride adducts, in particular polyisobutenylsuccinic anhydrides, are first produced by reacting the terminal double bonds of the polyisobutene with maleic anhydride, and said adducts are then reacted with certain amines or alcohols to give the additive. Since it is mainly the vinylidene double bonds which react in the adduct formation with maleic anhydride, whereas, without the addition of halogens, the double bonds located further in the interior of the macromolecules react to a substantially smaller extent, if at all, depending on their position in the macromolecule, the proportion of terminal double bonds in the molecule is an important quality criterion for this type of polyisobutene.

According to Puskas et al., J. Polymer Sci.: Symposium No. 56, (1976), 191, the generation of the vinylidene double bonds and the isomerization of the terminal double bonds in the isobutene macromolecules to give internal double bonds are thought to take place in accordance with the following scheme:

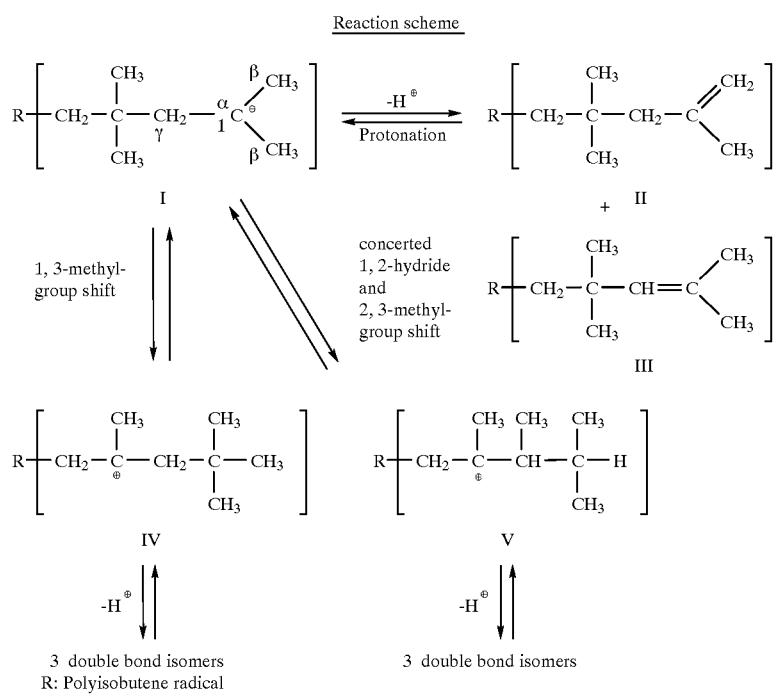

Reaction scheme 3 double bond isomers
R: Polyisobutene radical

The polyisobutene cation I formed in the course of the polymerization reaction can be converted into the corresponding polyisobutene by elimination of a proton. The proton may be eliminated either from one of the β-methyl groups or from the internal γ-methylene groups. Depending on from which of these two positions the proton is eliminated, a polyisobutene having a vinylidene double bond II or having a trisubstituted double bond III located near the end of the molecule is formed.

The polyisobutene cation I is relatively unstable and attempts to achieve stability by rearrangement into more highly substituted cations. Both 1,3-methyl group shifts to give the polyisobutene cation IV and successive or concerted 1,2-hydride and 2,3-methyl group shifts to give the polyisobutene cation V may take place. Depending on the position from which the proton is eliminated, three different double bond isomers of polyisobutene form from each of the cations IV and V. However, it is also possible that the cations IV and V undergo further rearrangement, resulting in migration of the double bond even further into the interior of the polyisobutene macromolecule.

All these deprotonations and rearrangements are equilibrium reactions and hence reversible, but in the end the formation of more highly stable, more highly substituted cations and hence the formation of polyisobutenes having an internal double bond, with the establishment of the thermodynamic equilibrium, are preferred. These deprotonations, protonations and rearrangements are catalyzed by traces of acid which may be present in the reaction mixture, but in particular by the Lewis acid catalyst itself which is required for catalyzing the polymerization. In view of the situation and since only polyisobutenes having vinylidene double bonds according to the formula II react very readily with maleic anhydride with adduct formation but in comparison polyisobutenes of formula III have substantially lower reactivity and other polyisobutenes having more highly substituted double bonds are virtually unreactive toward maleic anhydride, the continuing effort on the part of many research groups to find improved processes for the prepration of highly reactive polyisobutenes with increasingly higher contents of terminal double bonds is understandable.

The preparation of low molecular weight, highly reactive polyisobutenes from isobutene or isobutene-containing hydrocarbon streams, in particular from $C_4$ cuts obtained from steam crackers or FCC crackers (FCC: Fluid Catalyzed Cracking) and substantially freed from 1,3-butadiene originally present therein, ie. refined $C_4$ fractions, is disclosed in a number of patents, for example in EP-A 145 235, EP-A 481 297, DE-A 27 02 604, EP-A 628 575, EP-A 322 241 and WO 93/10063.

A disadvantage of this process is that fluorine-containing byproducts are formed according to the use of a $BF_3$ complex catalyst. The fluorine contents of the polyisobutenes prepared by these processes may be up to 200 ppm. Exposing these fluorine-containing polyisobutenes to elevated temperatures results in elimination of hydrogen fluoride, which is highly corrosive in the presence of water. This problem is particularly serious with the use of isobutene-containing $C_4$ cuts as starting material, since the content of n-butenes may result in the formation of relatively stable secondary fluorides of polyisobutene, which, during the further derivatization of the polyisobutene to give fuel and lubricating oil additives or during the subsequent use of these fuel additives in the engine, can then undergo cleavage with formation of hydrogen fluoride and thus of course corrosion damage. The corrosion problem thus also occurs during use.

When $C_4$ cuts are used, once again the n-butenes contained in these hydrocarbon streams are likely to be incorporated in the growing polymer chain. This results in termination of the polymerization, and the selectivity for the formation of highly reactive polyisobutene, ie. polyisobutene having a high content of vinylidene double bonds, decreases.

While the stated problems of the preparation of low molecular weight polyisobutenes having molecular weights of from 500 to 5000 are substantially solved by the method described in DE-A 195 20 078, it is unlikely that the procedures described there can be applied to the preparation of polyisobutene having molecular weights above 5000 dalton. As a rule, processes for the preparation of low molecular weight polyisobutenes cannot be successfully applied to higher molecular weight polyisobutenes because of the low isobutene conversions, the increasing solution viscosity and the additional occurrence of miscibility gaps, which makes it generally more difficult to control the reaction. Furthermore, the monomer purity plays a much greater role in the preparation of higher molecular weight polymers, in particular in the cationic polymerization, than in the preparation of low molecular weight polymers.

WO 85/01942 describes a process for the preparation of polyisobutene having molecular weights $M_n$ of from 100 to 15,000, preferably from 500 to 5000, in particular from 750 to 2500, dalton. The polymer obtained in Example 1 has a molecular weight $M_n$ of 955 dalton. On the basis of the melt viscosities stated for the other examples (up to $82 \times 10^{-2}$ ssu≈1.6 Pa.s at 100° C.), a value of 1500 dalton was estimated as an upper limit for the molecular weights of the polymers described therein. The stated process also proves unsuitable for the preparation of polyisobutene having molecular weights above 5000.

It is an object of the present invention to provide a process for the preparation of medium molecular weight polyisobutenes having a high content of terminal double bonds. Furthermore, the process should also permit the preparation of polyisobutenes having the stated properties from hydrocarbon mixtures, for example refined $C_4$ fractions, which still contain polymerizable impurities. Moreover, the polyisobutene obtained should have a narrow molecular weight distribution.

We have found that this object is achieved, surprisingly, by a process for the preparation of medium molecular weight, highly reactive polyisobutene having an average molecular weight $M_n$ of more than 5000 and up to 80,000 dalton and containing at least 50 mol % of terminal vinyl groups by cationic polymerization of isobutene or an isobutene-containing hydrocarbon mixture in the liquid phase in the presence of a boron trifluoride complex catalyst at below 0° C. and from 0.5 to 20 bar, wherein the polymerization is carried out in one stage at a steady-state isobutene concentration of from 20 to 80% by weight and a boron trifluoride concentration of from 50 to 500 ppm.

The object of a high content of terminal double bonds and a narrow molecular weight distribution is achieved, according to the invention, if isobutene or an isobutene-containing hydrocarbon mixture is polymerized by a continuous process at a steady-state isobutene concentration of from 20 to 80, preferably from 30 to 70, % by weight, based on the reactor content. The catalyst concentration in the reactor is from 50 to 500 ppm (parts by weight $BF_3$, based on the reactor content). The steady-state concentration of the further liquid hydrocarbons may be up to 60, preferably from 10 to 40, % by weight. The polyisobutene concentration is as a rule from 10 to 30% by weight, based in each case on the reactor content. Suitable starting materials (isobutene feed stock) for the novel process are both pure isobutene and isobutene-containing hydrocarbon mixtures, for example butadiene-free refined $C_4$ fractions from crackers or $C_4$ cuts from the dehydrogenation of isobutane, having isobutene contents above 40% by weight. The isobutene concentration in the reactor may be predetermined by the hydrocarbon mixture used or may be established by adding solvents which are inert under the reaction conditions, such as saturated hydrocarbons, for example pentane, hexane or isooctane, or halogenated hydrocarbons, such as dichloromethane or trichloromethane.

Catalysts used in the novel process are boron trifluoride complexes with complexing agents which influence the polymerization activity of the boron trifluoride so that, on the one hand, the polymerization gives a low molecular weight polyisobutene and, on the other hand, the isomerization activity of the boron trifluoride with respect to the isomerization of terminal double bonds to unreactive or only slightly reactive double bonds located in the interior of the polyisobutene molecule is reduced. Examples of suitable complexing agents are water, $C_1$–$C_{20}$-alcohols, phenol, which may carry one or more alkyl substituents, $C_2$–$C_{10}$-diols, $C_1$–$C_{20}$-carboxylic acids and asymmetric $C_3$–$C_{20}$-dialkyl ethers, in particular those having at least one tertiary carbon adjacent to the ether oxygen. Complexing agents from the class consisting of the $C_1$–$C_{20}$-alcohols, in particular the $C_1$–$C_4$-alcohols, are preferably used in the novel process. Ethers, as described in WO 93/10063, react via the alcohol complex after cleavage. Among the alcohols, the monohydric, secondary $C_3$–$C_{20}$-alcohols, as described in EP-A 628 575, have a particularly advantageous effect as complexing agents on the polymerization and isomerization activity of the boron trifluoride catalyst, isopropanol and 2-butanol being particularly noteworthy. Boron trifluoride complex catalysts in which the molar boron trifluoride/complexing agent ratio A:B is from 1:1 to 1:3, in particular from 1:1.05 to 1:2.5, particularly preferably from 1:1.25 to 1:2, are preferably used in the novel process. As stated above the boron trifluoride complex catalysts may be formed before their use, as described, for example, in EP-A 145 235, or may be produced in situ in the polymerization reactor, as described in EP-A 628 575. Gaseous boron trifluoride is advantageously used as raw material for the preparation of the boron trifluoride complex catalysts, it being possible to use technical-grade boron trifluoride (purity, 96.5% by weight) still containing small amounts of sulfur dioxide, preferably high-purity boron trifluoride (purity, 99.5% by weight). Boron trifluoride which is free of silicon tetrafluoride is particularly preferably used for the preparation of the catalyst.

According to the invention, the polymerization of the isobutene is carried out by a continuous process. It may be effected in conventional reactors, such as tube reactors, tube-bundle reactors or stirred kettles. The polymerization is preferably carried out in a loop reactor, ie. a tube or tube-bundle reactor with continuous circulation of the reaction mixture, where the ratio of feed to circulation F/C may be varied as a rule from 1:5 to 1:500, preferably from 1:10 to 1:200, V/V.

The polymerization is advantageously carried out at below 0° C. In order to achieve the desired polymer properties, the reaction is preferably carried out at from 0 to −40° C., in particular from −10 to −40° C., particularly preferably from −20 to −40° C. As a rule, the polymerization is carried out at from 0.5 to 20 bar. The choice of the pressure range depends primarily on the process conditions. Thus, in stirred kettles it is advisable to operate with evaporative cooling and hence under autogenous pressure, ie. reduced pressure, whereas circulation reactors (loop reactors) operate better at superatmospheric pressure. At the same time, the admixing of the boron trifluoride is accelerated there, and this reactor type is therefore preferred. However, the choice of the pressure is generally unimportant with regard to the result of the polymerization reaction.

The polymerization is preferably carried out under isothermal conditions. Since the polymerization reaction is exothermic, the heat of polymerization must be removed in this case. This is done, as a rule, with the aid of a cooling apparatus which can be operated, for example, with liquid ammonia as coolant. Another possibility is to remove the heat of polymerization by evaporative cooling on the product side of the reactor. This is done by evaporating the isobutene and/or other readily volatile components of the isobutene feedstock. The method of cooling depends on the reactor type used in each case. Tube reactors are preferably cooled by means of external cooling, the reaction tubes being cooled, for example, by means of a cooling jacket containing boiling ammonia. Stirred kettle reactors are preferably thermostatted by internal cooling, for example by means of cooling coils, or by evaporative cooling on the product side.

The residence time of the isobutene to be polymerized in the reactor is from 1 to 120, preferably from 8 to 60, minutes, depending on the reaction conditions and the desired properties of the polymer to be prepared.

It has proved particularly advantageous for the result of the reaction if the reaction conditions and the residence time are combined in such a way that the isobutene content in the reactor discharge is from 30 to 70% by weight, based on the total reactor discharge. The unconverted isobutene is separated from the reaction products and the catalysts by working up and, after removal of the traces of moisture resulting from the working up, for example by drying over a molecular sieve, can be recycled to the reaction.

The discharged reaction mixture is advantageously worked up by passing it into a medium which deactivates the polymerization catalyst and thus terminates the polymerization. For example, water, alcohols, acetonitrile, ammonia or aqueous solutions of mineral bases, such as alkali metal and alkaline earth metal hydroxide solutions, solutions of carbonates of these metals, etc. may be used for this purpose. Water at from 20 to 40° C., is preferably used, for example in the form of a wash under superatmospheric pressure. In the further course of working up, the polymerization mixture is, if required, subjected to one or more extractions to remove residual amounts of catalyst, usually. methanol or water washes. In the case of the water wash, hydrogen fluoride formed in the course of the polymerization is removed in addition to the catalyst. Unconverted isobutene, solvent and volatile isobutene oligomers are then separated off by distillation. The bottom product is freed from residues of the solvent and monomers, for example by means of an annular evaporator or by devolatilization in an extruder.

If pure isobutene is used as feedstock, this too, like isobutene oligomers and solvent, can be recycled to the polymerization. When isobutene-containing $C_4$ cuts are used, the unconverted isobutene and the other $C_4$ hydrocarbons are in general not recycled but are used for other purposes, for example for the preparation of low molecular weight polyisobutene or of methyl tert-butyl ether. Readily volatile fluorine-containing byproducts, such as sec-butyl fluoride, can be removed from the polyisobutene together with the other hydrocarbons and separated from these hydrocarbons by distillation or extraction.

The novel process makes it possible to prepare medium molecular weight, highly reactive polyisobutenes both from pure isobutene and from isobutene-containing hydrocarbon mixtures. By means of the novel process, it is possible to achieve molecular weights of from 5000 to 80,000, preferably from 8000 to 25,000, dalton in combination with a terminal double bond content of 50, preferably above 70, in particular above 80, mol % and high polyisobutene yeild. Moreover, the polyisobutenes obtained are characterized by a narrow molecular weight distribution. They preferably have a dispersity $M_w/M_n$ of from 2 to 4, in particular from 2 to 3. The melt viscosity of the polyisobutenes obtainable according to the invention is above 30 Pa-s (at 100° C.). The kinematic solution viscosity η (determined as the Ubbelohde viscosity in 2,2,4-trimethylpentane at 20° C., cf. DIN 51562) is from 0.88 mm$^2$/s (1% strength by weight solution) to 1 mm$^2$/s (0.2% strength by weight solution).

Owing to the high content of terminal double bonds, the novel polymers are particularly useful for polymer-analogous reactions. The novel polyisobutenes are suitable as additives for lubricants, which are likewise a subject of the present application, as sealants and sealing compounds for insulating glazing and as a base for chewing gums. These may also be used, for example, as carriers for drug active ingredients, such as appetite depressants, nicotine, etc.

EXAMPLES

The average molecular weights ($M_n$) of the polymers prepared according to the examples were determined by means of gel permeation chromatography (GPC), standardized polyisobutenes being used for the calibration. The number average molecular weight $M_n$ was calculated from the resulting chromatograms using the equation $$M_n = \frac{\Sigma c_i}{\Sigma \frac{c_i}{M_i}}$$

where $c_i$ is the concentration of the individual polymer species i in the polymer mixture obtained and $M_i$ is the molecular weight of the individual polymer species i. The molecular weight distribution, referred to below as dispersity D, was calculated from the ratio of the weight average molecular weight ($M_w$) to the number average molecular weight ($M_n$) using the equation $$\frac{M_w}{M_n} = D.$$

The weight average molecular weight $M_w$ was determined from the resulting chromatograms with the aid of the formula $$M_w = \frac{\Sigma c_i M_i}{\Sigma c_i}.$$

The content of organically bonded fluorine in the polymerization solution as well as in the polyisobutene was determined by conventional methods of elemental analysis: for this purpose, the organic material was digested by the Wickbold or Schöniger combustion method, the liberated fluoride was absorbed in water and the fluoride content of the aqueous fluoride solution obtained was determined potentiometrically with the aid of commercial fluoride ion-selective electrodes on the basis of a calibration curve. The content of organically bonded fluoride in the sample can easily be calulated from the fluoride content of the solution measured in this manner and the amount of sample used for the combustion (reference: F. Ehrenberger: Quantitative Elementaranalyse; VCH Verlagsgesellschaft, Weinheim, page 436 et seq., page 424 et seq., page 617 et seq.).

Preparation of polyisobutene

Example 1

In a loop reactor comprising a circulation pump and 6.8 m of Teflon tubing having an internal diameter of 6 mm and a total volume of 200 ml, the following steady-state concentrations were established at a reactor temperature of –20° C., a boron trifluoride feed of 3 mmol/h, an isopropanol feed of 4.1 mmol/h and a F/C ratio of 1:100:

Isobutene: 48% by weight
Hexane: 30% by weight
Polyisobutene: 22% by weight.

The residence time was 9.8 seconds per circulation. The reaction was terminated in the discharge line, which was located 2 cm before the feed, by adding 100 ml/h of water. After a multistage wash under superatmospheric pressure at 20° C., the organic phases were let down and were heated to 220° C. The volatile hydrocarbons were condensed in a dry ice condenser. Converted isobutene and hexane losses were replenished and the mixture was dried over a 3 Å molecular sieve during a residence time of 5 minutes and was recycled to the reactor. The colorless distillation residue contained polyisobutene having a molecular weight $M_n$ of 16,000 and a dispersity D of 2.2 with a fluorine content of less than 3 ppm.

Example 2

In an apparatus according to Example 1, a 50% strength isobutene from the dehydrogenation of isobutane was polymerized at –30° C. A steady-state isobutene concentration of 40% by weight was established by means of a boron trifluoride feed of 2.2 mmol/h and an isopropanol feed of 2.9 mmol/h at a F/C ratio of 1:100 and a residence time of 9.8 seconds. Working up was carried out as described in Example 1, except that recycling of the unconverted isobutene was dispensed with. The colorless distillation residue contained a polyisobutene having a molecular weight $M_n$ of 14,000 and a dispersity D of 2.4 with a fluorine content of less than 3 ppm.

We claim:

1. A process for the preparation of medium molecular weight, highly reactive polyisobutene having an average molecular weight $M_n$ of more than 5000 and up to 80,000 dalton and containing at least 50 mol % of terminal double bonds by cationic polymerization of isobutene or an isobutene-containing hydrocarbon mixture in the liquid phase in the presence of a boron trifluoride complex catalyst at below 0° C. and from 0.5 to 20 bar, wherein the polymerization is carried out in one stage at a steady-state isobutene concentration of from 20 to 80% by weight and a boron trifluoride concentration of from 50 to 500 ppm.

2. A process as claimed in claim 1, wherein the steady-state isobutene concentration is from 30 to 70% by weight.

3. A process as claimed in claim 1, wherein the polymerization is carried out by a circulation method with a feed/circulation ratio F/C of from 1:5 to 1:500.

4. A process as claimed in claim 1, wherein the boron trifluoride complex catalyst is composed of boron trifluoride A and at least one oxygen-containing compound as complexing agent B, selected from water, alcohols, dialkyl ethers, alkanecarboxylic acids and phenols.

5. A process as claimed in claim 4, wherein the complex of boron trifluoride A and complexing agent B is generated in situ, the ratio A:B being from 1:1 to 1:3.

6. A process as claimed in claim 1, wherein the boron trifluoride complex catalyst used is a complex of boron trifluoride and isopropanol or 2-butanol.

* * * * *